Dec. 12, 1939.   P. J. FEYKERT   2,183,065
ORNAMENTAL PANEL SUPPORTING MOLDING
Filed March 11, 1938
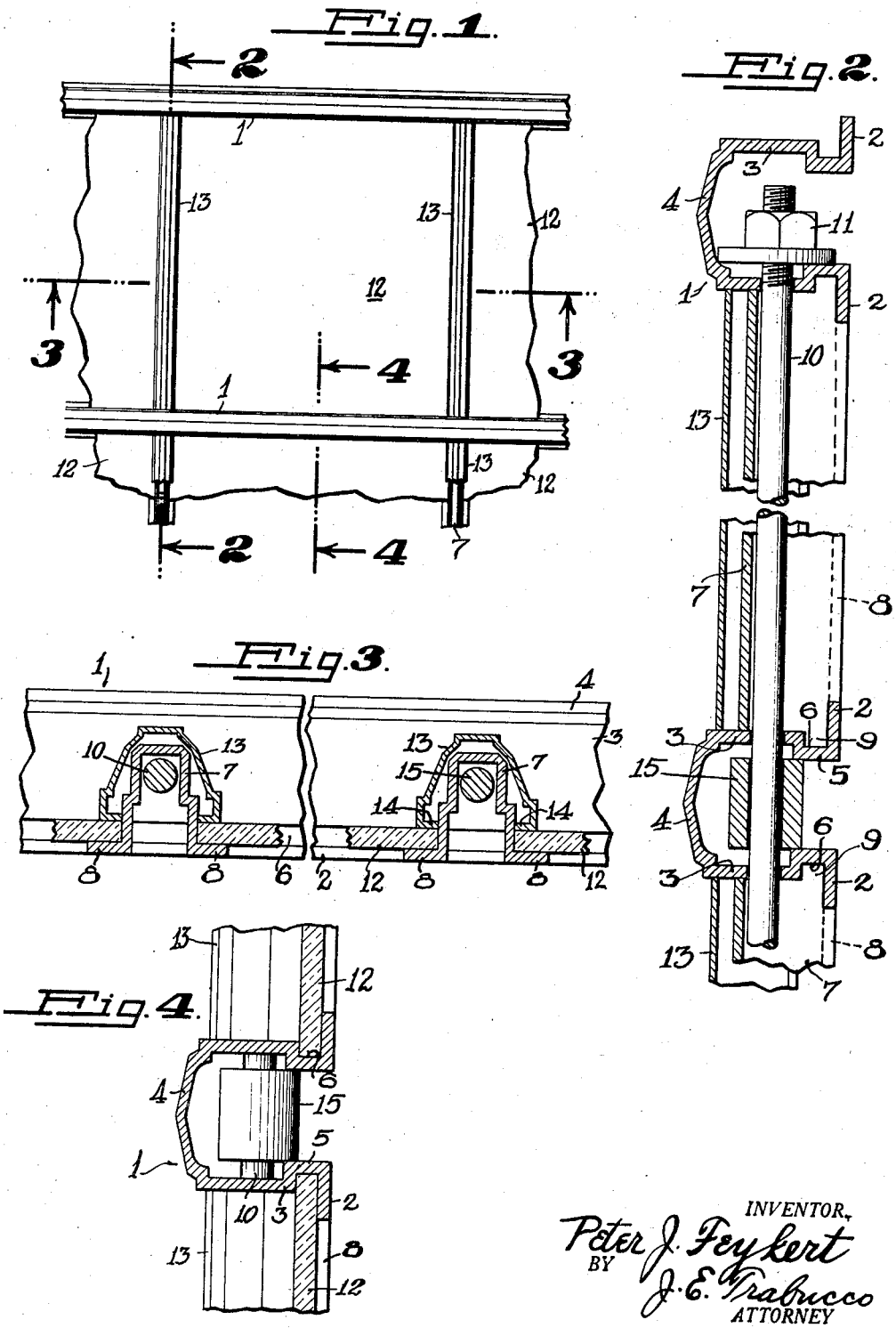
INVENTOR,
Peter J. Feykert
BY J. E. Trabucco
ATTORNEY Patented Dec. 12, 1939

2,183,065

UNITED STATES PATENT OFFICE 2,183,065

ORNAMENTAL PANEL SUPPORTING MOLDING

Peter J. Feykert, San Francisco, Calif.

Application March 11, 1938, Serial No. 195,297

1 Claim. (Cl. 189—85)

This invention relates to improvements in panel supporting moldings, and it has for its primary object the provision of an improved molding construction wherein the various parts are assembled and held in their respective positions by novel means not requiring the use of screws or other devices which would detract from its ornamental appearance.

Another object of my invention is to provide an improved panel supporting molding which embodies novel interlocking means for securely maintaining the various parts thereof in assembled relationship with respect to one another.

Other and further objects of my invention will be pointed out hereinafter or will be indicated in the appended claim or will be obvious to one skilled in the art upon an understanding of the present disclosure. For the purpose of this application I have elected to show herein certain forms and details of a panel supporting molding representative of my invention; it is to be understood, however, that the embodiment of my invention herein shown and described is for the purpose of illustration only, and that therefore it is not to be regarded as exhaustive of the variations of the invention, nor is it to be given an interpretation such as might have the effect of limiting the claim, short of the true and most comprehensive scope of the invention in the art.

In the accompanying drawing:

Fig. 1 is a section of a wall structure showing the application of my improved panel supporting molding;

Fig. 2 is a sectional view taken on the line 2—2 of Fig. 1;

Fig. 3 is a sectional view taken on the line 3—3 of Fig. 1; and

Fig. 4 is a sectional view taken on the line 4—4 of Fig. 1.

Referring to the drawing, the numerals 1, 1 designate suitably spaced and parallel channeled members preferably of sufficient length to extend across a wall or other supporting structure upon which a paneled molding is to be applied. The channeled members 1 may assume horizontal, vertical or other suitable positions, and any suitable means may be employed to tie them to a supporting wall or other structure. Each of the channeled members 1 is formed with outwardly disposed flanges 2, 2, which normally are positioned against a supporting structure, with parallel sides 3, 3 and also with an ornamental side 4. The parallel sides 3, 3, at points near the outwardly disposed flanges 2, 2, are each formed with inwardly protruding parts 5, 5 which form longitudinally disposed grooves 6, 6 at opposite sides of the channeled members.

Disposed at right angles to and positioned between the channeled members 1 and suitably spaced one from another in accordance with the width of the enclosed panels, are parallel hollow spacing members 7 which are substantially U-shaped in cross section. Each of the hollow members 7 is provided with outwardly disposed flanges 8, 8 which are normally positioned in a common plane with the flanges 2, 2 of the channeled members 1. The ends of the hollow members 7 are normally in close engagement with the sides 3 of the channeled members 1, and each is provided with protruding end projections 9, 9 which fit within the grooves 6, 6 of the said channeled members. The fitting of the end projections 9, 9 of the hollow members 7 within the grooves 6, 6 of the channeled members 1 provides suitable interlocking means for securing the said hollow members to the channeled members.

Slidably extending through suitable holes provided in the sides 3, 3 of the channeled members 1 are tie rods 10 which snugly fit within and extend longitudinally through the hollow spacing members 7. In ordinary practice each of the tie rods 10 passes longitudinally through a number of the aligned hollow spacing members 7, and nuts 11 or other means at the opposite ends of the said rods serve to tie the said spacing members and the intervening channeled members 1 firmly together. The tie rods 10 not only serve to clamp the channeled members 1 into firm engagement with the ends of the hollow spacing members 7, but the said rods also prevent the lateral shifting of the said hollow members.

Occupying the rectangular spaces which are bordered by the channeled members 1 and the hollow spacing members 7 are panels 12 made from glass, metal or other suitable material. Opposite side edges of the panels 12 fit in the grooves 6, 6 located at opposite sides of the channeled members 1. Extending longitudinally over the hollow spacing members 7 are ornamental U-shaped facing members 13 which have their side edges bent inwardly as at 14. The ornamental facing members 13 are preferably made from a resilient or flexible metal so that when they are applied to their respective hollow spacing members 7 they will firmly clamp thereon and thereby be maintained in a position in which their inwardly bent edges 14 will engage with and extend over the opposite side edges of the panels 12. The ornamental facing members 13 not only assist in maintaining the panels 12 in place, but they cover over any rough or unsightly edges which the latter might have.

So as to prevent the channeled members from being pressed out of shape or disfigured when the nuts 11 are tightened on the tie rods 10, suitable blocks or spacers 15 are positioned inside the said channeled members.

Having described my invention, what I claim is:

A wall structure comprising a rectangular panel, longitudinal rails having grooves for embracing two opposite edges of the panel, transverse hollow rails extending between the longitudinal rails and having tongues for engaging the grooves of the latter, said transverse rails lying alongside the other two edges of the panel, facing members frictionally engaging the transverse rails and bearing against said latter edges of the panel, and tie rods housed within the transverse rails and projecting through the longitudinal rails for fastening the structure together.

PETER J. FEYKERT.